United States Patent Office 3,542,751
Patented Nov. 24, 1970

3,542,751
PRODUCTION OF CIS-1,4-POLYDIENES BY MEANS OF A TERNARY CATALYST SYSTEM
Morford C. Throckmorton, Akron, Ohio, assignor to The Goodyear Tire & Rubber Company, Akron, Ohio, a corporation of Ohio
No Drawing. Filed Apr. 9, 1969, Ser. No. 814,832
The portion of the term of the patent subsequent to Apr. 15, 1986, has been disclaimed
Int. Cl. C08d 1/14, 1/56
U.S. Cl. 260—94.3                              8 Claims

ABSTRACT OF THE DISCLOSURE

There is disclosed a process for the polymerization of butadiene and butadiene in mixture with other conjugated diolefins to form polymers containing a high portion of butadiene units in the cis-1,4 configuration comprising contacting at least one diolefin with a catalyst comprising (1) at least one compound selected from a group consisting or organometallic compounds wherein the metal is selected from Groups I, II and III of the Periodic Table and hydrides of metals of Groups II and III of the Periodic Table, their monomeric and polymeric halide derivatives, amine derivatives and complexes of these hydrides with amines, ethers or other molecules capable of forming complex compounds with these hydrides, (2) at least one compound selected from a group consisting of organonickel salts of carboxylic acids, organonickel complex compounds, nickel tetracarbonyl and pi-bonded organonickel compounds and (3) at least one compound selected from a group consisting of fluorine containing phosphoric, sulfonic and sulfinic acids and fluorine containing esters of these acids.

---

This invention is directed to methods of polymerizing butadiene and butadiene in mixture with other diolefins to form polymers having a high content of cis-1,4 addition. It is also directed to catalyst systems useful for this purpose.

Polymers of butadiene or butadiene in mixture with other diolefins containing a high proportion of the butadiene units in the cis-1,4 configuration possess properties which make them useful as synthetic rubbers.

It is an object of this invention to provide a method whereby butadiene can be polymerized to a high content of cis-1,4 polybutadiene. Another object is to provide a catalyst system by which these polymerizations may be accomplished. Another object is to form copolymers of diolefins, such as isoprene, and butadiene, in which the polybutadiene segment has a high content of cis-1,4 structure. Another object is to produce high cis-1,4 polybutadiene with excellent processing properties. Other objects will become apparent as the description proceeds.

The term "good processability" describes a polymer which before and after compounding manifests properties ideal for use on rubber processing equipment. These desirable properties lead to ready banding on mix mills, good tack and ease of extrudability.

Based on the most practical test of what indicates good polymer processability, that is, manifestations during actual factory processing, polybutadiene produced by a prior art ternary catalyst system comprising (1) triethylaluminum, (2) organonickel salt and (3) boron trifluoride· diethyl ether complex, which possesses a very high cis-1,4 molecular structure of about 98%, shows an appreciable improvement or superiority in processability over most other commercially available polybutadienes.

The present invention also employs a ternary catalyst system somewhat similar to the just mentioned catalyst system but employs different and novel catalysts as the third catalyst component. This new ternary catalyst system utilizes fluorine-containing mineral acids and/or derivatives thereof instead of the boron trifluoride etherate. The polymers produced by the new system possess the good processability of the polymers produced by the system comprised of (1) triethylaluminum, (2) an organonickel salt and (3) boron trifluoride·diethyl ether complex.

Thus, according to the present invention, butadiene or butadiene in combination with other diolefins is polymerized by contact, under solution polymerization conditions, with a catalyst comprising (1) at least one compound selected from a group of compounds consisting of (a) hydrides of metals of Groups II and III of the Periodic System, (b) monomeric halide derivatives of hydrides of metals of Groups II and III, (c) polymeric halide derivatives of hydrides of metals of Groups II and III, (d) amine derivatives of hydrides of metals of Groups II and III, (e) complexes of hydrides of metals of Groups II and III with amines, ethers or other molecules capable of forming complexes with such hydrides and (f) organometallic compounds wherein the metal is selected from the metals of Groups I, II and III of the Periodic System; (2) at least one organometallic compound selected from the group consisting of (a) nickel salts of carboxylic acids, (b) organic complex compounds of nickel, (c) nickel tetracarbonyl and (d) pi-bonded organonickel compounds and (3) at least one compound selected from the group consisting of (a) fluorine containing phosphoric acids, (b) esters of fluorine containing phosphoric acids, (c) fluorine containing sulfonic acids of the formula $HSO_3R$ wherein R is selected from a group consisting of fluorine, perfluoroalkyl and perfluoroaryl radicals; and (d) fluorine containing sulfinic acids of the formula $HSO_2R$ wherein R is selected from a group consisting of fluorine, perfluoroalkyl and perfluoroaryl radicals. The Groups I, II and III referred to in (1) above are Groups I, II and III of the Periodic Table.

The compounds which are capable of being employed as the first or (1) catalyst components, with the exception of the compounds defined in (f), may be described as hydrides of metals of Groups II and III of the Periodic System, derivatives of such hydrides or complexes of such hydrides. When referring to the above hydrides, derivatives of such hydrides and complexes of such hydrides, a special nomenclature can be employed. For example, when the metal selected from Groups II and III of the Periodic System is aluminum, the hydride, derivatives of the hydride and complexes of the hydride, are referred to as alanes. In analogy, when boron is the metal selected, the hydride and its derivatives and complexes are referred to as boranes. When gallium is the metal selected, the hydride and its derivatives and complexes are referred to as gallanes, and when magnesium is the metal selected from Groups II and III, the hydride and its derivatives and complexes are referred to as magnanes. Thus, a compound such as $H_2AlCl \cdot N(CH_3)_3$ is known as trimethylamine chloroalane. It may, of course, also be called trimethylamine chloroaluminum hydride and both names are equally descriptive and valid. Since AlH$_3$ is known to actually be a polymeric species and many of its derivatives may be polymeric also, the definition above is intended to include polymeric species as well. Polymeric species of such metal hydrides may be readily formed when one of the substituents on the aluminum is polyvalent.

Certain of the compounds which can be employed as the first or (1) catalyst component of the present invention can be represented by the three formulae as follows:

FORMULA 1

wherein Me represents a metal of Groups II or III of the Periodic System; H is hydrogen; X is selected from hydrogen or halogen and Z is selected from hydrogen, halogen, oxygen or nitrogen; R represents an alkyl, aryl, alkaryl, aralkyl or cycloalkyl radical; $a$, $b$ and $c$ are integers; $a$ is one unit less than the absolute value of the valence of Z and may be 0, 1 or 2; $b$ is 0 or 1 as is $c$, while the sum of $b$ plus $c$ is one unit less than the valence of Me. It is understood, of course, that when $b$ is zero there is no Me to R bond.

FORMULA 2

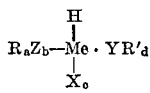

which represents complexes of the compounds of Formula 1. In Formula 2, Y represents oxygen, nitrogen, sulfur or phosphorus; R' represents hydrogen or an alkyl, aryl, alkaryl, aralkyl or cycloalkyl radical; and $d$ is an integer equal to the valence of Y. Where there is more than one R' group they need not be the same. The remainder of the symbols are as in Formula 1.

FORMULA 3

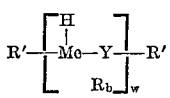

where the compound is polymeric in nature; $w$ represents the number of monomer repeat units in the polymer which may vary over a wide range but which has a preferred range of from about 4 to about 50 and all the other symbols are the same as in Formula 2 above. Please note that Me in Formula 3 must represent only a Group III metal and not a Group II metal.

The metals from Group II or III of the Periodic System are preferably chosen from aluminum, magnesium, zinc or cadmium. Of these, aluminum is the most preferred.

The first catalyst component as illustrated by symbolic Formula 1 above can be represented by the following chemical compounds. The compounds listed below are based on aluminum as the representative metal selected from either Group II or Group III and are properly called alane compounds. The representative compounds, although not exhaustive of their class are as follows:

dimethylamino aluminum hydride or dimethylamino alane: (CH$_3$)$_2$NAlH$_2$
diisobutylamino aluminum hydride: (iC$_3$H$_7$)$_2$NAlH$_2$
diphenylamino aluminum hydride: (C$_6$H$_5$)$_2$NAlH$_2$
dimethylamino bromoaluminum hydride or dimethylamino bromoalane: (CH$_3$)$_2$NAlHBr
diethylamino chloroaluminum hydride: (C$_2$H$_5$)$_2$NAlHCl
methylethylamino iodoaluminum hydride: (CH$_3$)(C$_2$H$_5$)NAlHI
ethoxy bromoaluminum hydride: C$_2$H$_5$OAlHBr The first catalyst component as illustrated by Formula (2) are organic addition complexes formed by a central metal hydride of Groups II and III metals complexed with various organic ligands. Representatives of such compounds include:

trimethylamino alane: AlH$_3 \cdot$N(CH$_3$)$_3$
triethylamine chloroalane or triethylamine chloroaluminum hydride complex: AlH$_2$Cl$\cdot$N(C$_2$H$_5$)$_3$
trimethylamine chloroalane: AlH$_2$Cl$\cdot$N(CH$_3$)$_3$
trimethylamine dichloroalane: AlHCl$_2 \cdot$N(CH$_3$)$_3$
trimethylamine chlorozinc hydride complex or trimethylamine chlorozincane: ZnHCl$\cdot$N(CH$_3$)$_3$
diethyl ether alane: AlH$_3 \cdot$O(C$_2$H$_5$)$_2$
diethyl ether dichloroalane: AlHCl$_2 \cdot$O(C$_2$H$_5$)$_2$
diethyl ether diiodoalane: AlHI$_2 \cdot$O(C$_2$H$_5$)$_2$
diethyl sulfide alane: AlH$_3 \cdot$S(C$_2$H$_5$)$_2$
triphenyl phosphine alane: AlH$_3 \cdot$P(C$_6$H$_5$)$_3$ and the like.

Examples of organic molecule types capable of forming addition complexes or ligand groups with metals of Groups II or III of the Periodic System include ethers, cyclic ethers, tetrahydrofuran, tertiary amines and the like.

Also, polymers of the above aluminum amino hydrides can be formed. A representative example which is by no means exclusive of all the polymers which can be formed is poly-(n-butyliminoalane) represented by the structural formula:

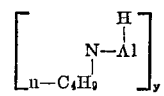

where the structure represents the basic monomer unit and $y$ represents the number of units in the polymer. For optimum service as a catalyst component, the polymeric alane derivatives should be within a molecular weight range which will permit the polymer to be readily dissolved in a suitable organic solvent. More will be said below of the solvents suitable for use in solution polymerization.

Another group of compounds capable of being employed as the first or (1) catalyst compound is defined in (f) as being organometallic compounds wherein the metals are selected from Groups I, II and III of the Periodic System and are organo-compounds of such metals as lithium, sodium, potassium, rubidium, cesium, magnesium, calcium, strontium, beryllium, barium, zinc, cadmium, aluminum, gallium and indium. The term "organometallic" as used here to refer to compounds, indicates that metals of Groups I, II and III of the Periodic System are attached directly to a carbon atom of alkyl, cycloalkyl, aryl, arylalkyl and alkaryl radicals. All of the above compounds may be used in the practice of this invention.

When considering the organometallic compounds containing metals from Groups I, II and III, it is preferred for this invention to use organoaluminum compounds, organomagesium compounds, organozinc compounds and organolithium compounds.

By the term "organoaluminum compound" is meant any organoaluminum compound responding to the formula

in which R$_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, alkoxy and aralkyl. Representative of the compounds responding to the formula set forth above are: diethylaluminum fluoride, di-n-propylaluminum fluoride, di-n-butylaluminum fluoride, diisobutylaluminum fluoride, dihexylaluminum fluoride, dioctylaluminum fluoride, and diphenylaluminum fluoride. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p - tolylethylaluminum hydride, p - tolyl-n-propylaluminum hydride, p - tolylisopropylaluminum hydride, benzylethylaluminum hydride, and other organoaluminum hydrides. Also included are diethylethoxyaluminum and dipropylethoxyaluminum. Also included are trimethylaluminum, triethylaluminum, tri - n - propylaluminum, triisopropylaluminum, tri - n - butylaluminum, triisobutylaluminum, tripentylaluminm, trihexylaluminum, tricyclohexylaluminum, trioctylaluminum, triphenylaluminum, tri - p-tolylaluminum, tribenzylaluminum, ethyldiphenylaluminum, ethyl - di - p - tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant first any organomagnesium complex responding to the formula $R_aMgX_b$ where R bay be alkyl, aryl, arylalkyl or alkaryl; X is a halogen and $a$ and $b$ are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also "organomagnesium compounds" means any organomagnesium compound or any organomagnesium halide of the Grignard type corresponding to the formulas $R_2Mg$ or $RMgY$ where R may be alkyl, aryl, aralkyl or alkaryl and Y is fluorine, or $R'R''Mg$ where R' may be alkyl, aryl, or alkaryl and R'' may be either alkyl, aryl, aralkyl or alkaryl. Representative among the compounds responding to these formulae are diethylmagnesium, dipropylmagnesium, ethylmagnesium fluoride and phenylmagnesium fluoride.

By the term "organozinc compound" is meant any organozinc compound responding to the formula $R_2Zn$ where R may be alkyl, aryl, alkaryl or aralkyl. Representative among such compounds are diethylzinc, dibutylzinc or diphenylzinc.

By the term "organolithium compounds" is any organolithium compound responding to the formula R-Li where R is an alkyl, alkaryl, aralkyl or aryl group. Representative among the compounds responding to the formula set forth above are ethyllithium, propyllithium, n-, sec- or t - butyllithium, hexyllithium, styryllithium or phenyllithium. Also, the organolithium aluminum compounds may be used. These compounds respond to the formula $R'R''_3LiAl$ where R' and R'' may be alkyl, alkaryl or aralkyl groups and R' and R'' may or may not be the same group. Representative of these compounds are n - butyltriisobutyllithium aluminum, tetrabutyllithium aluminum, butyltriethyllithium aluminum and tetraisobutyllithium aluminum.

Representative of other organometallic compounds with metals selected from the Groups I, II and III of the Periodic System are compounds containing at least one of the metals, sodium, potassium, calcium, beryllium, cadmium and mercury combined with at least one organic radical selected from the group consisting of alkyls, alkaryls, aralkyls and aryls.

The second or (2) catalyst component is selected from a class consisting of (a) a nickel salt of a carboxylic acid, (b) an organic complex compound of nickel, (c) nickel tetracarbonyl and (d) pi bonded organonickel compounds. These compounds can be compounds of the said metal with a mono- or bi-dentate organic ligand containing up to 20 carbon atoms. "Ligand" is defined as an ion or molecule bound to and considered bonded to a metal atom or ion. Monodentate means having one position through which covalent or coordinate bonds with the metal may be formed; bidentate means having two positions through which covalent or coordinate bonds with the metal may be formed. These compounds can also be compounds wherein the bonding between the nickel and the organic group is not of the classical covalent or coordinate type as described above, but rather one based on vacant pi orbitals arising from double bonded structures in the organic moiety.

Representative examples of the nickel salts of carboxylic acids and organic complex compounds of nickel are nickel benzoate, nickel acetate, nickel naphthenate, bis(alpha furyl dioxime)nickel, nickel octanoate, nickel palmitate, nickel stearate, nickel acetylacetonate, bis(salicylaldehyde ethylene diimine)nickel and nickel salicylaldehyde. Representative examples of the pi-bonded organonickel compounds are bis (π-allyl)nickel, bis(π-methallyl) nickel, bis(π-crotyl)nickel, bis(π-cyclooctenyl)nickel, bis (π-cyclopentenyl)nickel and the like.

The third or (3) catalyst component of this invention is a fluorine-containing compound selected from the group consisting of (a) fluorine containing phosphoric acids, (b) esters of fluorine containing phosphoric acids, (c) fluorine containing sulfonic acids of the formula $HSO_3R$ wherein R is selected from the group of fluorine, perfluoroalkyl and perfluoroaryl and (d) fluorine containing sulfinic acid of the formula $HSO_2R$ wherein R is selected from the group of fluorine, perfluoroalkyl and perfluoroaryl radicals.

Representative examples of such materials are difluorophosphoric acid, monoethylmonofluorophosphate, monophenylmonofluorophosphate, monofluorophosphoric acid, fluorosulfonic acid, trifluoromethylsulfonic acid pentafluoroethylsulfonic acid, pentafluorophenylsulfonic acid, paratetrafluorotolylsulfinic acid, fluorosulfinic acid, trifluoromethylsulfinic acid, paratetrafluorocumylsulfinic acid and pentafluorophenylsulfinic acid. Fluorosulfonic acid is preferred.

The three component catalyst system of this invention has shown polymerization activity over a wide range of catalyst concentrations and catalyst ratios. Apparently, the three catalyst components interact to form the active catalyst. As a result, the optimum concentration for any one catalyst component is dependent upon the concentration of each of the other catalyst components. Although polymerization will occur over a wide range of catalyst concentrations and ratios, polymers having the most desirable properties are obtained over a narrower range. It has been found that polymerization will occur when the mole ratio of the first or (1) component of the catalyst system to the organonickel compound ranges from about 0.3/1 to about 500/1, and when the mole ratio of the third or (3) catalyst component to the organonickel compound ranges from about 0.3/1 to about 300/1 and where the mole ratio of the first or (1) component of the catalyst system to the third or (3) component of the catalyst system ranges from about 0.05/1 to about 4/1.

The preferred (1)/(2) mole ratio ranges from about 0.5/1 to about 150/1; the preferred (3)/(2) mole ratio ranges from about 0.5/1 to about about 150/1; and the preferred (1)/(3) mole ratio ranges from about 0.05/1 to about 2/1.

The three catalyst components may be charged to the polymerization system as separate catalyst components in either a stepwise or a simultaneous manner, sometimes called "in situ." The catalyst may also be "preformed"

outside the polymerization system whereby all the catalyst components are mixed in the absence of the butadiene, either with or without an inert diluent and the complete blend then added to the polymerization system.

The catalyst may also be "preformed" outside the polymerization system whereby all the catalyst components are mixed in the presence of butadiene. The amount of the butadiene present can vary over a wide range but must be a catalytic amount. For good results the molar ratio or butadiene to the nickel or (2) catalyst component can range from about 0.2/1 to about 1000/1. A preferred mole ratio of butadiene to the nickel or (2) catalyst component ranges from about 8/1 to about 500/1.

The concentration of the total catalyst system employed depends on a number of factors such as purity of the system, polymerization rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, cycloaliphatic hydrocarbons and ethers, representative of which are pentane, hexane, heptane, toluene, benzene, cyclohexane, diisopropyl ether and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperatures employed in the practice of this invention have not been found to be critical and may vary from a low temperature, such as −10° C. or below, up to high temperatures of 100° C. or higher. However, a more desirable temperature range is between about 30° C. and about 90° C. Ambient pressures are usually used but higher or lower pressures may be employed.

The practice of this invention is further illustrated by reference to the following examples which are intended to be representative rather than restrictive of the scope of this invention.

EXAMPLE I

A purified butadiene in benzene solution containing 10 grams of butadiene per hundred milliliters of solution was charged to a number of 4-oz. bottles. Nitrogen was flushed over the surface of this premix while the catalyst was charged in the amounts shown in the table below. The catalyst employed was a mixture of 0.25 molar (M) triethylaluminum (Teal) in benzene, 0.05 M nickel octanoate (Ni salt or Ni Oct) in benzene and 0.50 M difluorophosphoric acid ($HPO_2F_2$) in benzene, and was charged by the in situ method. The bottles were capped tightly and then were tumbled end-over-end for 18 hours in a water bath maintained at 50° C. The polymerizations were deactivated by the addition of 1 part per hundred monomer (p.h.m.) of triisopropanol amine (Tipa) and stabilized with 1 p.h.m. dibutyl-p-cresol.

The results are shown in Table 1 below. Dilute solution viscosity is shown as DSV and is indicative of the molecular weight of the polymer.

TABLE 1

| Exp. No. | Millimole/10.0 gm. BD | | | Yield, wt. percent | DSV | Percent cis-1,4- |
|---|---|---|---|---|---|---|
| | TEAL | Ni oct. | $HPO_2F_2$ | | | |
| 1 | 0.06 | 0.005 | 0.27 | 26 | [a]ND | ND |
| 2 | 0.06 | 0.005 | 0.30 | [b]23 | ND | ND |
| 3 | 0.06 | 0.05 | 0.40 | 30 | 1.57 | ND |
| 4 | 0.06 | 0.005 | 0.50 | 61 | 1.64 | 95.0 |
| 5 | 0.10 | 0.005 | 0.50 | 52 | 1.67 | ND |

[a] ND = not determined.
[b] Polymerization time = 41 hours.

EXAMPLE II

A series of bottles was prepared and polymerized in the same manner as in Example I above. However, the 0.5 M difluorophosphoric acid ($HPO_2F_2$) was replaced by a 0.25 M solution in benzene of fluosulfonic acid ($HSO_3F$).

The results are shown in Table 2 below. Dilute solution viscosity is shown as DSV and is indicative of the molecular weight of the polymer.

TABLE 2[a]

| Exp. No. | Millimole/100 gm. BD | | | Yield, wt. percent | DSV | Percent cis-1,4- |
|---|---|---|---|---|---|---|
| | TEAL | Ni oct. | $HSO_3F$ | | | |
| 1 | 0.06 | 0.005 | 0.04 | 37 | 2.9 | [b]ND |
| 2 | 0.06 | 0.005 | 0.06 | 67 | 2.6 | 97.7 |
| 3 | 0.06 | 0.005 | 0.07 | 58 | 2.65 | ND |
| 4 | 0.06 | 0.005 | 0.10 | [c]39 | 2.6 | 95.9 |
| 5 | 0.06 | 0.02 | 0.10 | 41 | 1.94 | ND |
| 6 | 0.10 | 0.005 | 0.10 | 50 | 2.75 | ND |
| 7 | 0.15 | 0.02 | 0.10 | 36 | ND | ND |

[a] Polymerization time = 66 hours.
[b] ND = not determined.
[c] Polymerization time = 20 hours.

While certain representative embodiments and details have been shown for the purpose of illustrating the invention, it will be apparent to those skilled in this art that various changes and modifications may be made therein without departing from the spirit or scope of the invention.

What is claimed is:
1. A process for the polymerization of butadiene or butadiene in mixture with isoprene to form polymers or copolymers containing a high portion of butadiene units in the cis-1,4 configuration which comprises contacting butadiene or butadiene in mixture with isoprene under polymerization conditions with a catalyst comprising:
(1) at least one organometallic compound selected from the group consisting of organometallic compounds corresponding to the formulae

(a)    Al $R_1$ $R_2$ $R_3$ in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, and arylalkyl;

(b)    $R_2Mg$ wherein R may be alkyl, aryl, arylalkyl or alkaryl;

(c)    R MgF wherein R may be alkykl, aryl, arylalkyl or alkaryl;

(d)    $R_2Zn$ wherein R may be alkyl, aryl, alkaryl or arylalkyl;

(e)    RLi wherein R is an alkyl, alkaryl, arylalkyl or aryl;
(2) at least one nickel containing compound selected from the group consisting of:
(a) nickel salts of carboxylic acids,
(b) organic complex compounds of nickel,
(c) nickel tetracarbonyl and
(d) pi bonded organonickel compounds, and (3) at least one fluorine containing compound selected from the group consisting of:
  (a) fluorine containing phosphoric acids,
  (b) esters of fluorine cotaining phosphoric acids,
  (c) fluorine containing sulfonic acids of a formula $HSO_3R$ wherein R is selected from a group consisting of fluorine, perfluoroalkyl, perfluoroaryl radicals, and
  (d) fluorine containing sulfinic acids of the formula $HSO_2R$ wherein R is selected from a group consisting of fluorine, perfluoroalkyl and perfluoroaryl radicals and wherein the mole ratio of (1)/(2) ranges from about 0.5/1 to about 150/1, the mole ratio of (3)/(2) ranges from about 0.5/1 to about 150/1, and the mole ratio of (1)/(3) ranges from about 0.05/1 to about 2/1.

2. A process according to claim 1 in which the organometallic compound is an organoaluminum compound.

3. A process according to claim 2 in which the organoaluminum compound is a trialkyl aluminium.

4. A process according to claim 1 in which the nickel containing compound is a nickel salt of a carboxylic acid or an organic complex compound of nickel.

5. A process according to claim 1 in which the fluorine containing compound is fluorosulfonic acid.

6. A process according to claim 1 in which 1,3-butadiene only is polymerized.

7. A process according to claim 1 in which the polymerization is conducted as a solution polymerization in an inert solvent.

8. A catalyst composition comprising:
  (1) at least one organometallic compound corresponding to the formulae
  (a) $AlR_1R_2R_3$ in which $R_1$ is selected from the group consisting of alkyl (including cycloalkyl), aryl, alkaryl, arylalkyl, hydrogen and fluorine, $R_2$ and $R_3$ being selected from the group consisting of alkyl (including cycloalkyl), aryl, alkaryl, and arylalkyl;

(b) $R_2Mg$ wherein R may be alkyl, aryl, arylalkyl or alkaryl;

(c) $RMgF$ wherein R may be alkyl, aryl, arylalkyl or alkaryl;

(d) $R_2Zn$ wherein R may be alkyl, aryl, alkaryl or arylalkyl;

(e) $RLi$ wherein R is an alkyl, alkaryl, arylalkyl or aryl;

(2) a nickel salt of a carboxylic acid or an organic complex compound of nickel, and (3) a fluorine containing phosphoric or sulfonic acid, and wherein the mole ratio of (1)/(2) ranges from about 0.5/1 to about 150/1, the mole ratio of (3)/(2) ranges from about 0.5/1 to about 150/1, and the mole ratio of (1)/(3) ranges from about 0.05/1 to about 2/1.

References Cited
UNITED STATES PATENTS

| | | | |
|---|---|---|---|
| 3,170,907 | 2/1965 | Ueda et al. | 260—94.3 |
| 3,228,917 | 1/1966 | Childers | 260—84.1 |
| 3,247,175 | 4/1966 | Van Volkenburgh et al. | 260—94.3 |
| 3,414,555 | 12/1968 | Jenkins et al. | 260—94.3 |

JOSEPH L. SCHOFER, Primary Examiner

J. C. HAIGHT, Assistant Examiner

U.S. Cl. X.R.

252—431; 260—80.7, 82.1, 94.2, 94.4

PO-1050
(5/69)

UNITED STATES PATENT OFFICE
CERTIFICATE OF CORRECTION

Patent No. 3,542,751              Dated November 24, 1970

Inventor(s)   Morford C. Throckmorton

It is certified that error appears in the above-identified patent and that said Letters Patent are hereby corrected as shown below:

Column 3, line 72, change the formula: "$(C_2H_5)_2NAH1HCl$" to
          read: -- $(C_2H_5)_2NAlHCl$ --;
Column 4, line 46, change "compound" to -- component --;
          line 62, change "organomagesium" to --
                   -- organomagnesium --;
Column 5, line 30, change "bay" to -- may --;
Column 6, line 42, between "acid" and "pentafluo-" place a
                   comma -- , --;
          line 51, change "interact" to -- interreact --;
Column 7, line 10, change "or" (first occurrence) to -- of --
          line 67, change "(Teal)" to -- (TEAL) --;
          line 74, change "(Tipa)" to -- (TIPA) --;
Column 8, in Table 2, Exp. No. 7, under "Yield, wt. percent"
                   change "36" to -- 26 --;
Column 8, line 25, change "Millimole/100 gm. BD" to
                   -- Millimole/10.0 gm. BD --; and
Column 9, line 4, change "cotaining" to -- containing --.

Signed and sealed this 29th day of June 1971.

(SEAL)
Attest:

EDWARD M. FLETCHER, JR.                    WILLIAM E. SCHUYLER,
Attesting Officer                          Commissioner of Pate